United States Patent [19]

Park

[11] Patent Number: 5,331,624
[45] Date of Patent: Jul. 19, 1994

[54] PICKUP FEED MECHANISM

[75] Inventor: Seong-yeon Park, Suwon, Rep. of Korea

[73] Assignee: SamSung Electronics Co., Ltd., Kyungki-do, Rep. of Korea

[21] Appl. No.: 826,793

[22] Filed: Jan. 28, 1992

[30] Foreign Application Priority Data

May 31, 1991 [KR] Rep. of Korea .................... 91-9093

[51] Int. Cl.[5] .............................................. G11B 7/08
[52] U.S. Cl. .................................. 369/215; 369/219; 369/244
[58] Field of Search ............... 369/215, 219, 220, 221, 369/199, 258, 244, 195, 249

[56] References Cited

U.S. PATENT DOCUMENTS

| | | | |
|---|---|---|---|
| 4,953,154 | 8/1990 | Takahara et al. | 369/199 |
| 5,081,618 | 1/1992 | Abe | 369/199 |
| 5,097,465 | 3/1992 | Funabashi et al. | 369/199 |
| 5,172,370 | 12/1992 | Suzuki | 369/199 |

*Primary Examiner*—Stuart S. Levy
*Assistant Examiner*—Paul J. Ditmyer
*Attorney, Agent, or Firm*—Robert E. Bushnell

[57] ABSTRACT

A simplified pickup feed mechanism fox a dual-sided disc is disclosed, which prevents a pickup main body from being moved in an unbalanced state while investing the orientation of the pickup main body. The pickup feed mechanism comprises a moving shaft which is rotationally moved along a semicircular path extending between two guide shafts disposed above and below the dual-sided disc, from one end of a first guide shaft to one end of the opposite guide shaft. The moving shaft is combined with the pickup main body fed from one guide shaft and is then rotationally moved, thereby balancing the pickup main body. Accordingly, after the pickup main body is invested, it exactly meets with the other guide shaft. Thus, the disclosed pickup feed mechanism can be easily moved with only one driving mechanism on either the left or the right side of the motor. Further, its constitution is simplified and the ease in assembling is also improved. The disclosed pickup feed mechanism is an optical type and is applicable to any dual-sided reproducible disc device.

21 Claims, 3 Drawing Sheets

PICKUP FEED MECHANISM

BACKGROUND OF THE INVENTION

The present invention relates to a pickup feed mechanism for feeding a pickup capable of recording and reproducing optical information, and more particularly to a pickup feed mechanism used with a disc having information recorded on both sides.

Currently, a disc-shaped optical information medium is installed to be rotated in such widespread devices such as a compact disc player, a video disc player, a CD ROM drive, a magneto-optical disc device, etc. An optical pickup scans the disc with an optical beam, detects a reflected modulated light, and moves in a predetermined range to reproduce and record the information on the disc. Here, the optical pickup is installed to reciprocate along a radius of the disc or a curve within the radius. Accordingly, in the case of a disc with optical information on both sides, after the information on one side has been reproduced (or recorded), the disc needs to be reversed to operate on the other side.

However, Japanese laid-open patent publication Nos. Sho 63-302479 and Hei 2-21469 disclose that the disadvantage of individually reversing the dual-sided disc can be removed by utilizing a pickup feed mechanism having an U-shaped moving interval with a radius range of both sides of to the dual-sided reproducible disc. This is structured in such a way that a motor is installed in a pickup, a U-shaped rack gear member is always engaged with a gear driven by the motor, and two guide shafts penetrate and support the pickup during intervals where the pick up travels in the same direction as the surface of the disc. That is, after ending the reproducing for the one side of the disc, the pickup is separated from one of the two guide shafts and is invested by a U-turn along the rack gear member, and is then combined with the other guide shaft, thereby being moved to a position to reproduce the other side of the disc. However, in this structure, while the pickup is moved to invert its direction, it is moved without being connected to either of two guide shafts, so that there is a problem such that the left/right balance of the pickup is unstable. Accordingly, after the movement of directional inversion, there often occurs a problem that the pickup is not connected to the guide shaft. The solution to the above problems requires a complex, errorless, and highly accurate structure, e.g., the installation of a gear and a rack gear member on the left and right sides, but it is very expensive and creates manufacturing difficulties.

SUMMARY OF THE INVENTION

It is an object of the present invention to provide a pickup feed mechanism which solves the above described problems, is simplified, and has an increased ease assembly, by adding a means for keeping balance during the inverting movement of the pickup.

To achieve the object of the present invention, during inversion of the pickup, it is rotationally moved with a relatively short auxiliary guide shaft which can be rotationally moved along a semicircular path extending between the ends of the two guide shafts.

Accordingly, with regard to the present invention, there is provided a pickup feed mechanism installed with a motor inside the pickup and a gear driven by the motor, and provided with a U-shaped rack gear member engaged with the gear at all times and two guide shafts penetrating and supporting the pickup during travel of the pickup along both sides of the disc, which comprises:

a moving shaft disposed to precisely meet one end of each of the two guide shafts for selectively passing through and supporting the pickup;

rotation supporting means for rotationally moving the moving shaft along a semicircular path which extends from the ends of the two guide shafts; and locking means fox selectively locking or unlocking the rotation supporting means at positions where the moving shaft meets the two guide shafts, whereby the pickup is invested while coupled with the moving shaft.

According to the present invention as described above, when the orientation of the pickup, which has finished the reproducing or the recording with respect to one side of the disc, is inverted to reproduce the other side of the disc, it leaves one guide shaft and is simultaneously inserted onto the moving shaft; whereby the pickup and the moving shaft move together. Since the moving shaft is rotationally moved precisely along the semicircular path by the rotation supporting means, the moving shaft meets with the end of the other guide shaft after its movement is completed, and is also locked in a mated state by the locking means. Accordingly, during the movement to invert orientation, the pickup is moved with precision into the correct position while being left and right balanced. Here, the locking means unlocks the rotation supporting means when inversion starts or ends.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Figure 1:
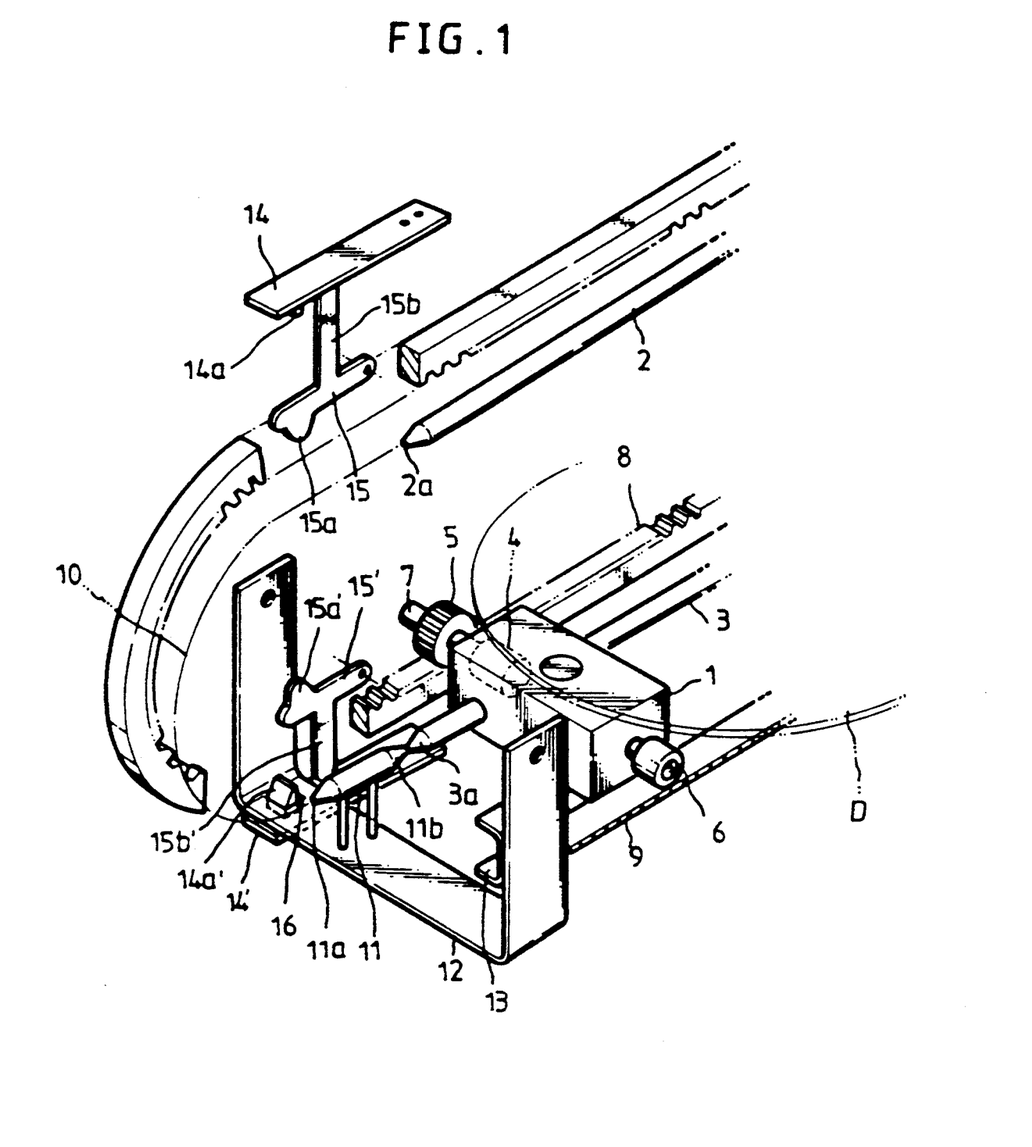
FIG. 1 is a schematic view of a pickup feed mechanism according to the present invention.

FIG. 1 is a schematic view of the pickup feed mechanism according to the present invention. A pickup main body 1 is coupled with one of two guide shafts 2 and 3 disposed above and below a disc D, and is movable direction with respect to the disc D, along a semicircular path which extends from an end of guide shaft 2 to an end of guide shaft 3. A motor 4 is installed in the pickup main body 1, one side of which is equipped with a gear 5 driven by the motor 4, and, guide rollers 6 and 7 are provided on opposite sides of the motor 4, respectively. The gear 5 is meshed with a rack gear member 8 which is in part parallel to guide shafts 2 and 3 for predetermined intervals, respectively. The upper and lower portions of rack gear member 8 form a connecting semicircle so that the pickup main body 1 can move between the two guide shafts. When the pickup main body 1 moves, guide roller 6 moves on a guide rail 9 to horizontally support the pickup main body 1 with the gear 5. The other roller, guide roller 7, is installed to interact with a locking means which will be described latex.

The pickup main body 1 has a feed path 10 on the circumference of a semicircle connecting the guide shafts 2 and 3, and a moving shaft 11 is installed so as to be moved along the feed path 10, with the result that the ends of moving shaft 11 come into contact with either of ends 2a or 3a of guide shafts 2 and 3, respectively. The width of moving shaft 11 is approximately that of the pickup main body 1, and its diameter equals those of guide shafts 2 and 3.

A rotating body 12 is provided as a means fox supporting the rotation of the moving shaft 11, and pivots on an axis located at the center of the feed path 10 on the circumference of a semicircle. The rotating body 12 U-shaped with squared corners and both ends supported at the pivoting axis, wherein the rotating body 12 supports the moving shaft 11 as it moves to match up either end 11a or 11b with ends 2a or 3a of guide shafts 2 and 3, respectively. A holder 13 is provided on the inner surface of one side of rotating body 12 to receive one guide roller 6 of the pickup main body 1 from a guide rail 9.

A locking means of the rotation supporting means is composed of upper and lower locking members 14 and 14' and their respective release levers 15 and 15'. The locking members 14 and 14' are plate springs and have hooks 14a and 14a' elastically hooked with the hole 16 of the rotating body 12. The release levers 15 and 15' have nubs 15a and 15a' to intercept guide roller 7, and fingers 15b and 15b' to depress locking members 14 and 14' and release the locking means.

Figure 2A:
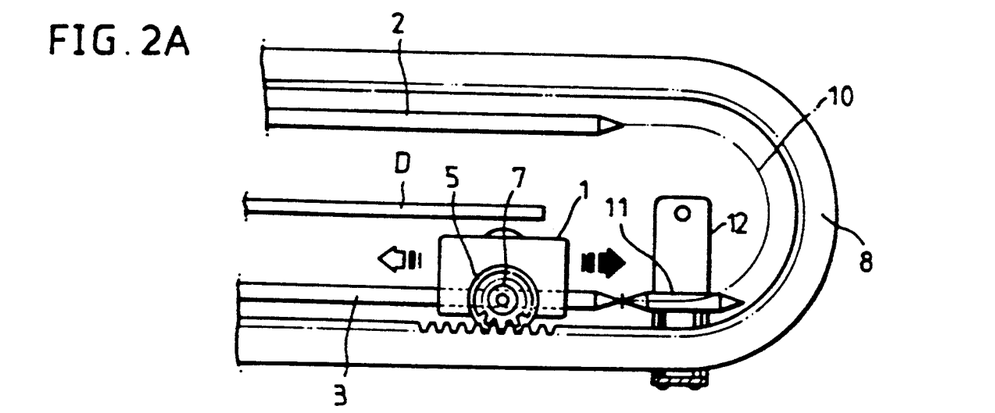
FIGS. 2A to 2C are side views which sequentially show the pickup feed process of the pickup feed mechanism according to the present invention.
Figure 2B:
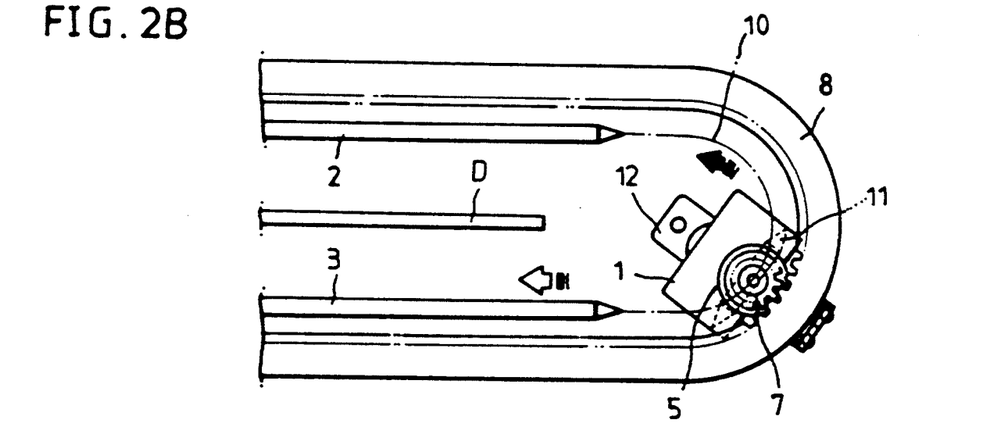
Figure 2C:
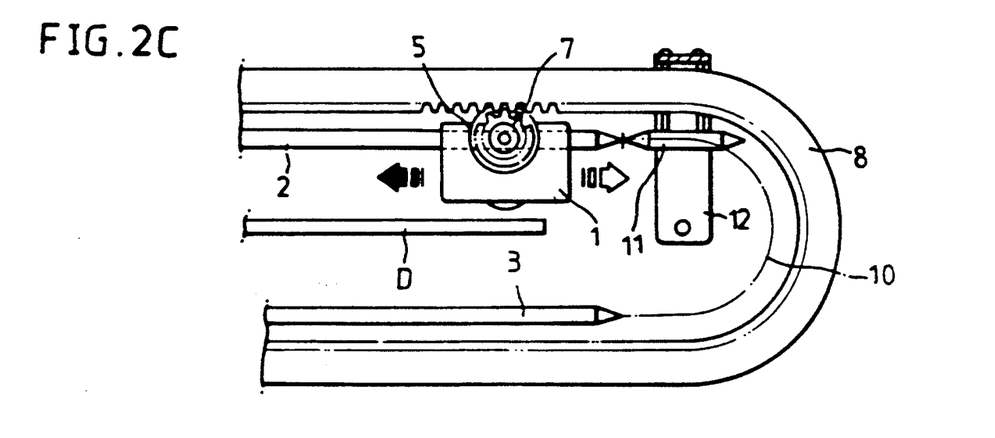

The feed process of the pickup main body 1 according to the embodiment of the present invention described above is shown in FIGS. 2A through 2C. FIG. 2A shows pickup main body 1 reproducing on the lower surface of disc D, and FIG. 2B shows the pickup main body 1 moving to invest itself and reproduce the opposite surface, while FIG. 2C shows the pickup operating on the disc's upper surface. That is, for the lower surface of the disc D to be reproduced, the pickup main body 1 couples with lower guide shaft 3 to scan the lower surface of disc D with a light beam, and moves along the guide shaft 3 by a gear 5 driven along rack gear member 8. For the upper surface to be reproduced, the pickup main body 1 is moved to the upper guide shaft 2, and in an inversely suspended state, continues moving in order to scan its light beam onto the upper surface of disc D. As its orientation is being inverted (moved from the disc's upper or lower surface to the opposite surface), the pickup main body 1 is rotationally moved while being coupled with and supported by moving shaft 11, and is driven by the rotation of gear 5 along rack gear member 8, as shown in FIG. 2B.

Figure 3A:
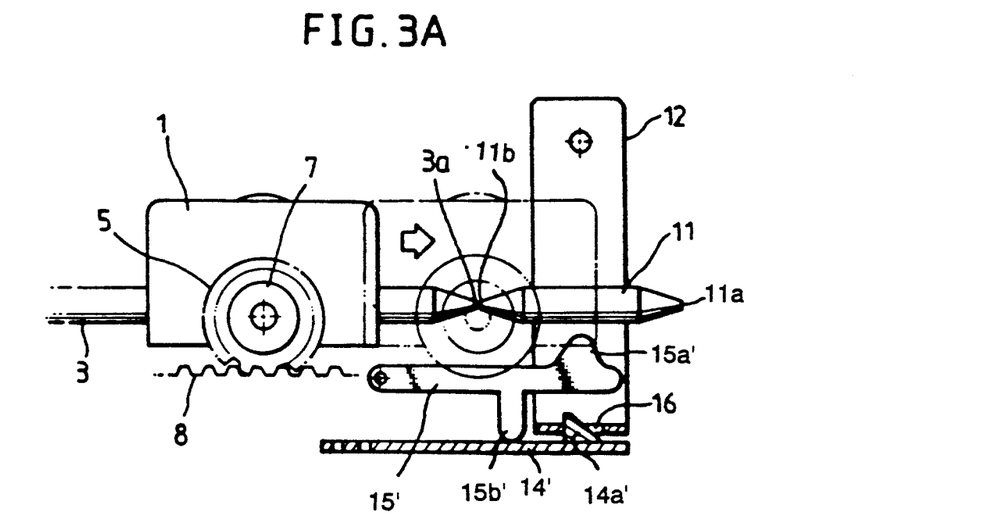
FIGS. 3A and 3B are side views showing the operations of the pickup feed mechanism of the present invention before and after the locking means unlocks the rotation supporting means.
Figure 3B:
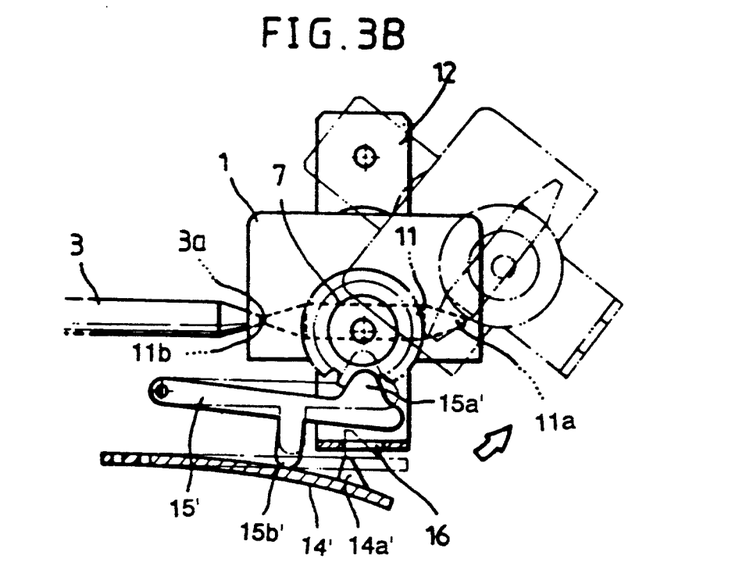

Here, with reference to FIGS. 3A and 3B, movement of pickup main body 1 from the guide shaft 3 to the moving shaft 11 will be described in detail. Since end 11b of moving shaft 11 is put in contact with the end 3a of guide shaft 3, and at the same time, is locked without being shoved by hook 14a' of locking member 14', the pickup main body 1 can be moved from the guide shaft 3 to the moving shaft 11. Then, as the pickup main body 1 completely engages with the moving shaft 11, the guide roller 7 of the pickup main body 1 arrives at the position where it pushes against a nub 15a'; thereby pivoting the release lever 15'. As a result, a finger 15b' displaces the locking member 14', unlocking rotating body 12. The rotating body 12 rotates as shown in FIG. 2B. Accordingly, movement of the pickup main body 1 and moving shaft 11 is enabled. To move pickup main body 1 from the moving shaft 11 back onto the guide shaft 3, the above-described operations are reversed.

As described above, according to the present invention, to invest the orientation of the pickup main body, it is rotationally moved together with the moving shaft, so that the left and sight balances in the moving interval are kept and correctly moved. Accordingly, because of precise movement, the mechanism does not stop. Moreover, the pickup feed mechanism is constructed with a simple structure and ease in assembly, thereby improving reliability. Also, since the present invention is capable of dual-sided reproduction, it can be provided at a low cost.

The present invention is not limited in the embodiment illustrated in the drawings, and it is inevitable that further modifications and alterations are possible while staying within the scope and range of the claims.

What is claimed is:

1. A pickup feed mechanism having a motor installed inside a pickup and a gear driven by the motor, and provided with a U-shaped rack gear member constantly engaged with the gear, a first guide shaft located on a first side of an optical disc and disposed parallel to the first side of the optical disc, passing through and supporting the pickup during motion of the pickup along the first side of the optical disc, and a second guide shaft located on a second side of the optical disc and disposed parallel to the second side of the optical disc, passing through and supporting the pickup during motion of the pickup along the second side of the optical disc, said pickup feed mechanism comprising:

a moving shaft disposed to contact an end of each of said first guide shaft and said second guide shaft;

said moving shaft, said first guide shaft and said second guide shaft lying within a single plane of reference;

rotation supporting means for rotationally moving said moving shaft along a semicircular path extending from said end of said first guide shaft to said end of said second guide shaft, said semicircular path lying within said single plane of reference;

said moving shaft coupling with said pickup during said rotational movement of said moving shaft along said semicircular path;

locking means for selectively locking and unlocking said rotation supporting means at a first position where said moving shaft meets said end of said first guide shaft and at a second position where said moving shaft meets said end of said second guide shaft;

said locking means comprising:

a locking member having a hook to be elastically combined with a hole formed on said rotation supporting means;

a release lever having a nub to intercept said pickup; and a finger formed to displace said locking member;

wherein said locking member, said release lever and said finger are installed at each location where said moving shaft meets one of said first and second guide shafts.

2. A pickup feed mechanism as claimed in claim 1, wherein said semicircular path of said moving shaft is subtended by a line which extends between each of said two guide shaft end.

3. A pickup feed mechanism as claimed in claim 1, wherein said gear and said U-shaped rack gear member are installed on one side of the pickup, and a guide roller installed on an opposite side of the pickup moves along a guide rail supporting said guide roller, so that both sides of the pickup are supported.

4. The pickup feed mechanism as claimed in claim 1, further comprised of said single plane of reference of said semicircular path being parallel to a plane of said U-shaped rack gear member.

5. A pickup feed mechanism having a motor installed inside a pickup and a gear driven by the motor, and provided with a U-shaped rack gear member constantly engaged with the gear, a first guide shaft located on a first side of an optical disc and disposed parallel to the first side of the optical disc, passing through and supporting the pickup during motion of the pickup along the first side of the optical disc, and a second guide shaft located on a second side of the optical disc and disposed parallel to the second side of the optical disc, passing through and supporting the pickup during motion of the pickup along the second side of the optical disc, said pickup feed mechanism comprising:
a moving shaft disposed to contact an end of each of said first guide shaft and said second guide shaft;
said moving shaft, said first guide shaft and said second guide shaft lying within a single plane of reference;
rotation supporting means for rotationally moving said moving shaft along a semicircular path extending from said end of said first guide shaft to said end of said second guide shaft, said path lying within said single plane of reference and subtended by a line extending between each of said two guide shaft ends;
said rotation supporting means comprising a rotating body having ends supported along an axis of rotation of said moving shaft;
said moving shaft coupling with said pickup during said rotational movement of said moving shaft along said semicircular path;
locking means for selectively locking and unlocking said rotation supporting means at a first position where said moving shaft meets said end of said first guide shaft and at a second position where said moving shaft meets said end of said second guide shaft.

6. A pickup feed mechanism as claimed in claim 5, wherein said locking means comprises:
a locking member having a hook to be elastically combined with a hole formed on said rotation supporting means;
a release lever having a nub to intercept said pickup; and
a finger formed to displace said locking member;
wherein said locking member, said release lever and said finger are installed at each location where said moving shaft meets one of said first and second guide shafts.

7. A pickup feed mechanism for inverting a pickup from a first side of an optical recording medium to a second side of the optical recording medium, said pickup feed mechanism comprising:
a first gear attached to the pickup and located adjacent to a first side of the pickup;
a motor for driving said first gear;
a first guide shaft located on a first side of the optical recording medium and disposed parallel to a surface of the optical recording, passing through and supporting the pickup during motion of the pickup along the first side of the optical recording medium;
a second guide shaft located on a second side of the optical recording medium and disposed parallel to the surface of the optical recording medium, passing through and supporting the pickup during motion of the pickup along the second side of the optical recording medium;
a U-shaped rack gear for engaging said first gear, and having a first and a second straight portion located on the first side and second side of the optical recording medium, respectively, said first and second straight portions being parallel to the surface of the optical recording medium;
a moving guide shaft disposed to move in a semicircular path from an end of said first guide shaft to an end of said second guide shaft, for passing through and supporting the pickup during the inverting of the pickup from the first side to the second side of the optical recording medium;
said moving shaft, said first guide shaft and said second guide shaft lying within a single plane of reference;
rotation support means for supporting said moving guide shaft during said movement of said moving guide shaft in said semicircular path, said semicircular path lying within said single plane of reference; and
locking means for maintaining said rotation support means in a first position where said moving guide shaft is adjacent to said first guide shaft, when said first gear engages said first straight portion, and for maintaining said rotation support means in a second position where said moving guide shaft is adjacent to said second guide shaft, when said first gear engages said second straight portion.

8. The pickup feed mechanism as claimed in claim 7, wherein said locking means further comprises:
a hole formed on said rotation support means;
contact means attached to the pickup;
a first locking member having a first hook for engaging said hole when said rotation support means reaches said first position;
a first release member having a first protrusion for contacting said contact means, said first release member pressing on said first locking member when said first protrusion contacts said contact means, to disengage said first hook from said hole;
a second locking member having a second hook for engaging said hole when said rotation support means reaches said second position; and
a second release member having a second protrusion for contacting said contact means, and second release member pressing on said second locking member when said second protrusion contacts said contact means, to disengage said second hook from said hole.

9. The pickup feed mechanism as claimed in claim 8, wherein said first locking member and said second locking member are leaf springs.

10. The pickup feed mechanism as claimed in claim 8, wherein:
said first release member comprises:
a first lever arm containing said first protrusion and rotatable about a first axis in a first direction due to said contact between said protrusion and said contact means; and a first finger connected to said first lever arm, for applying a force to said first locking member when said first lever arm rotates in said first direction; and said second release member comprises:

a second lever arm containing said second protrusion and rotatable about a second axis in a second direction due to said contact between said second protrusion and said contact means; and a second finger connected to said second lever arm, for applying a force to said second locking member when said second lever arm rotates in said second direction.

11. The pickup feed mechanism as claimed in claim 10, further comprising:

a guide roller located on a second side of the pickup opposite said first side of the pickup, for supporting the second side of the pickup; and a guide rail for supporting said guide roller during said motion of the pickup along the first side of the optical recording medium.

12. The pickup mechanism as claimed in claim 11, further comprising:

holding means attached to an inner surface of one side of said rotation support means, for receiving said guide roller when said moving guide shaft is passing through and supporting the pickup.

13. The pickup mechanism as claimed in claim 12, wherein said motor is located within the pickup.

14. The pickup feed mechanism as claimed in claim 8, further comprising:

a guide roller located on a second side of the pickup opposite said first side of the pickup, for supporting the second side of the pickup; and a guide rail for supporting said guide roller during said motion of the pickup along the first side of the optical recording medium.

15. The pickup mechanism as claimed in claim 14, further comprising:

holding means attached to an inner surface of one side of said rotation support means, for receiving said guide roller when said moving guide shaft is passing through and supporting the pickup.

16. The pickup mechanism as claimed in claim 8, wherein said contact means is coaxial with and fixed to said first gear.

17. A pickup feed mechanism for inverting a pickup from a first side of an optical recording medium to a second side of the optical recording medium, said pickup feed mechanism comprising:

drive means located within the pickup;

a first gear extending from a first side of the pickup and driven by said drive means;

first guide means disposed on said first side of the optical recording medium and parallel to a surface of the optical recording medium, for guiding the pickup during motion of the pickup along said first side of the optical recording medium and parallel to said surface;

second guide means disposed on said second side of the optical recording medium and parallel to said surface of the optical recording medium, for guiding the pickup during motion of the pickup along said second side of the optical recording medium and parallel to said surface;

moving guide means disposed to move in a semicircular path from an end of said first guide means to an end of said second guide means, for engaging and supporting the pickup during motion of the pickup from said first guide means to said second guide means;

said moving guide means, said first guide means and said second guide means lying within a single plane of reference;

a U-shaped gear having a first straight portion adjacent and parallel to said first guide means, a second straight portion adjacent and parallel to said second guide means, and a U-shaped portion connecting said first straight portion and said second straight portion, said U-shaped gear engaging said first gear in order to propel the pickup;

rotating support means for moving in said semicircular path to support said moving guide means, said semicircular path lying within said single plane of reference; and locking means for unlocking said rotating support means from a first position when the pickup means engages said moving guide means, and for locking said rotating support means in a second position when said moving guide means reaches said end of said second guide means.

18. A pickup feed mechanism as claimed in claim 17, wherein said locking means comprises:

a locking member having a hook to be elastically combined with a hole formed on said rotating support means;

a release lever having a nub to intercept said pickup; and a finger formed to displace said locking member;

wherein said locking member, said release lever and said finger are installed at each location where said moving shaft meets one of said first and second guide means.

19. A pickup feed mechanism for inverting a pickup from a first side of an optical recording medium to a second side of the optical recording medium, said pickup feed mechanism comprising:

a first gear attached to the pickup and located adjacent to a first side of the pickup;

a motor for driving said first gear;

a first guide shaft located on a first side of the optical recording medium and disposed parallel to a surface of the optical recording medium, passing through and supporting the pickup during motion of the pickup along the first side of the optical recording medium;

a second guide shaft located on a second side of the optical recording medium and disposed parallel to the surface of the optical recording medium, passing through and supporting the pickup during motion of the pickup along the second side of the optical recording medium;

a U-shaped rack gear constantly engaging said first gear, and having a first and a second straight portion located on the first side and second side of the optical recording medium, respectively, said first and second straight portions being parallel to the surface of the optical recording medium;

a moving guide shaft disposed to move in a semicircular path from an end of said first guide shaft to an end of said second guide shaft, for passing through and supporting the pickup during the inverting of the pickup from the first side to the second side of the optical recording medium;

said moving guide shaft, said first guide shaft and said second guide shaft lying within a single plane of reference;

rotation support for supporting said moving guide shaft during said movement of said moving guide shaft in said semicircular path, said semicircular path lying within said single plane of reference; and locking means for maintaining said rotation support means in a first position where said moving guide shaft is adjacent to said first guide shaft, when said first gear engages said first straight portion, and for maintaining said rotation support means in a second position where said moving guide shaft is adjacent to said second guide shaft, when said first gear engages said second straight portion;

said single plane of reference of said semicircular path being parallel to a plane of said U-shaped rack gear member.

20. A pickup feed mechanism as claimed in claim 19, wherein said locking means comprise:

a locking member having a hook to be elastically combined with a hole formed on said rotation support means;

a release lever having a nub to intercept said pickup; and a finger formed to displace said locking member;

wherein said locking member, said release lever and said finger are installed at each location where said moving shaft meets one of said first and second guide shafts.

21. A pickup feed mechanism for inverting a pickup from a first side of an optical recording medium to a second side of the optical recording medium, said pickup feed mechanism comprising:

a first gear attached to the pickup and located adjacent to a first side of the pickup;

a motor for driving said first gear;

a first guide shaft located on a first side of the optical recording medium and disposed parallel to a surface of the optical recording medium, passing through and supporting the pickup during motion of the pickup along the first side of the optical recording medium;

a second guide shaft located on a second side of the optical recording medium and disposed parallel to the surface of the optical recording medium, passing through and supporting the pickup during motion of the pickup along the second side of the optical recording medium;

a U-shaped rack gear constantly engaging said first gear, and having a first and a second straight portion located on the first side and second side of the optical recording medium, respectively, said first and second straight portions being parallel to the surface of the optical recording medium;

a moving guide shaft disposed to move in a semicircular path from an end of said first guide shaft to an end of said second guide shaft, for passing through and supporting the pickup during the inverting of the pickup from the first side to the second side of the optical recording medium;

said moving guide shaft, said first guide shaft and said second guide shaft lying within a single plane of reference; and rotation support means for supporting said moving guide shaft during said movement of said moving guide shaft in said semicircular path, said semicircular path lying within said single plane of reference;

said single plane of reference of said semicircular path being parallel to a plane of said U-shaped rack gear member.

* * * * *

UNITED STATES PATENT AND TRADEMARK OFFICE
CERTIFICATE OF CORRECTION

PATENT NO. : 5,331,624
DATED : 7 July 1994
INVENTOR(S) : Seong-yeon Park

It is certified that error appears in the above-indentified patent and that said Letters Patent is hereby corrected as shown below:

| | | |
|---|---|---|
| Column 1 | Line 37, | after "is", change "invested" to --inverted--, |
| | Line 57, | after "ease", insert --of--, |
| Column 2 | Line 10, | preceding "selectively", change "fox" to --for--, |
| | Line 55, | preceding "with", delete "direction", |
| Column 3 | Line 3, | change "latex" to --later--, |
| | Line 13, | after "means", change "fox" to --for--, |
| | Line 16, | after "12", insert --is--; |
| | Line 39, | preceding "itself", change "invest" to --invert--, |

UNITED STATES PATENT AND TRADEMARK OFFICE
CERTIFICATE OF CORRECTION

PATENT NO. : 5,331,624
DATED : 7 July 1994
INVENTOR(S) : Seong-yeon Park

It is certified that error appears in the above-indentified patent and that said Letters Patent is hereby corrected as shown below:

Column 4  Line 7,   after "to", change "invest" to --invert--,

Line 9,   preceding "balances", change "sight" to --right--

IN THE CLAIMS

Claim 2

Line 68,  after "shaft", change "end" to --ends--,

Column 9  Claim 20

Line 24,  after "means", change "comprise" to --comprises--:

Signed and Sealed this

Fifteenth Day of October, 1996

Attest:

BRUCE LEHMAN

Attesting Officer    Commissioner of Patents and Trademarks